United States Patent [19]
Wei

[11] 3,886,151
[45] May 27, 1975

[54] 7-[2-(HETEROAZINYLTHIO)ACETAMIDO] CEPHALOSPORANIC ACID DERIVATIVES

[75] Inventor: Peter H. L. Wei, Springfield, Pa.

[73] Assignee: American Home Products Corporation, New York, N.Y.

[22] Filed: Mar. 18, 1974

[21] Appl. No.: 452,012

[52] U.S. Cl. .............................. 260/243 C; 424/246
[51] Int. Cl. ............................................. C07d 99/24
[58] Field of Search ................................. 260/243 C

[56] References Cited
UNITED STATES PATENTS
| | | | |
|---|---|---|---|
| 3,499,893 | 3/1970 | Crast, Jr. ............................ | 260/243 |
| 3,627,760 | 12/1971 | Bickel et al. ........................ | 260/243 |
| 3,828,026 | 8/1974 | Woodward .................. | 260/243 C X |

Primary Examiner—Donald G. Daus
Assistant Examiner—Diana G. Rivers
Attorney, Agent, or Firm—Richard K. Jackson

[57] ABSTRACT

The invention presents 7-[2-(heteroazinylthio)acetamido]cephalosporanic acid derivatives as anti-bacterial agents.

4 Claims, No Drawings

7-[2-(HETEROAZINYLTHIO)ACETAMIDO] CEPHALOSPORANIC ACID DERIVATIVES

BACKGROUND OF THE INVENTION

Certain 7-(heterocyclylmercaptoacetylamino)cephalosporanic acids are known in the antibiotic art. For example U.S. Pat. No. 3,627,760 suggests various azole and azine modifications of mercaptoacetylamino cephalosporanic acid, although the patentees preferred the azole moiety as a particularly valuable modification. 7-[2-(Tetrahydro-2-pyrimidinylthio)acetamido] cephalosporanic acids are disclosed in U.S. Pat. No. 3,499,893.

DESCRIPTION OF THE INVENTION

In accordance with this invention there is provided a group of anti-bacterial agents of the formula:

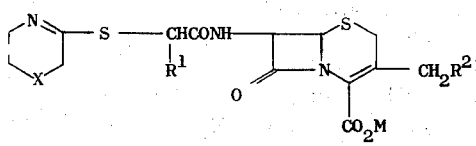

in which
$R^1$ is a member selected from the group consisting of —H, alkyl of 1 to 3 carbon atoms and phenyl;
$R^2$ is a member selected from the group consisting of —H and alkanoyloxy of 2 to 6 carbon atoms;
X is one of the groups —O—, —S— or —NH—;
M is a member selected from the group consisting of —H, an alkali metal cation and the ammonium ion; and the pharmaceutically acceptable acid addition salts thereof.

A preferred group of anti-bacterial agents are those of the formula:

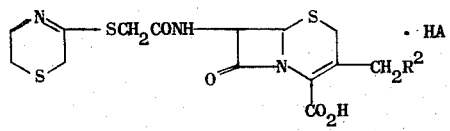

in which
$R^2$ is a member selected from the group consisting of —H and acetoxy and
A is —Cl or —Br.

The compounds of this invention are prepared by reacting a 2-thio-1,4-oxazine, thiazine, or diazine with bromoacetylcephalosporin in accordance with the equation

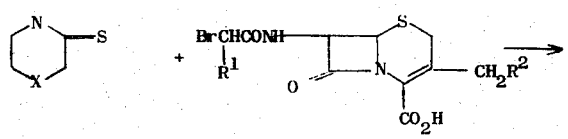

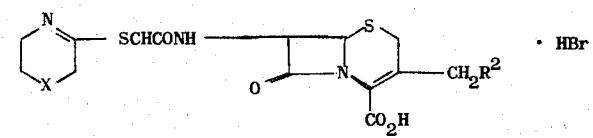

wherein the meaning of $R^1$, $R^2$ and X is provided above.

The compounds of this invention are anti-bacterial agents. Their activity against gram-positive, gram-negative and resistant strains of staphlococcus was established by using the well known agar serial dilution testing technique to determine the minimum inhibitory concentration at which each compound provides 100 percent inhibition of bacterial growth for a specific strain of various bacteria. Thus, the compounds of this invention are useful in the fields of comparative pharmacology and in microbiology and for the treatment of bacterial infections amenable to treatment with cephalosporin antibiotics.

The following examples illustrate the preparation of representative cephalosporin derivatives. The compounds produced in the following examples are generally recovered in the hydrohalide addition salt form frequently with a small amount of solvent, the latter being readily removed by further vacuum stripping of the product. The free bases are readily formed by neutralization of the hydrohalide by conventional techniques. The activity of each exemplified product is provided for those specific bacterial strains against which the compound exemplified was active at or below 250 micrograms per milliliter. The representative nature of the bacterial strains employed to demonstrate anti-bacterial activity are indicative of the broader applicability of the compounds of this invention in the control of bacterial infestations other than those specifically referred to in each of the following examples. The bacteria are named followed by the specific strain and the concentration of the test compound needed to provide 100 percent inhibition. The abbreviations for each bacteria are:

| | |
|---|---|
| BA SU | Bacillus subtilis |
| ST AU | Staphylococcus aureus |
| NE CA | Neisseria catarrhalis |
| ES CO | Escherichia coli |
| SA PA | Salmonella paratyphi |
| KL PN | Klebsiella pneumoniae |
| PR VU | Proteus vulgaris |
| HE SP | Herellea species |
| BO BR | Bordetella bronchiseptica |

EXAMPLE I

7-[2-(5,6-Dihydro-2H-1,4-thiazin-3-ylthio)acetamido]cephalosporanic acid 7-(2-Bromoacetamido)cephalosporanic acid (0.80 gram 2 millimole) and 3-thioxo-1, 4-2H-tetrahydrothiazine (0.27 gram 2 millimole) were dissolved in acetone and the solution was stirred at room temperature for 4 hours. After some insoluble material was filtered off the solvent was removed. The residual solid (0.90 gram) after trituration with diethyl ether was collected.

Elemental Analysis for
$C_{16}H_{19}N_3O_6S_3 \cdot HBr \cdot 1/2(CH_3)_2CO \cdot 1/5(C_2H_5)_2O$
Calc'd: C, 38.95; H, 4.24; N, 7.54.
Found: C, 39.03; H, 4.31; N, 7.56.

| | | |
|---|---|---|
| BA SU | 6633 | .244 |
| ST AU | 6538P | 1.95 |
| ST AU | SMITH | 1.95 |
| ST AU | CHP | 7.81 |
| ST AU | 53-180 | 3.90 |
| NE CA | 8193 | 125 |
| ES CO | 9637 | 125 |
| SA PA | 11737 | 15.6 |
| KL PN | 10031 | 31.3 |
| BO BR | 4617 | 62.5 |
| PR VU | 6896 | 62.5 |

EXAMPLE II

7-[2-(5,6-Dihydro-2H-1,4-thiazin-3-ylthio)acetamido]-3-methyl-8-oxo-5-thia-1-azabicyclo[4.2.0]oct-2-ene-2-carboxylic acid.

The title compound is produced following the procedure of Example I with the exception that desacetoxy cephalosporanic acid is employed as the reactant.

| | Elemental Analysis for $C_{14}H_{17}N_3O_4S_3 \cdot HBr \cdot \frac{3}{4}(CH_3)_2CO$ | |
|---|---|---|
| Calc'd: | C, 38.12; H, 4.43; N, 8.21. | |
| Found: | C, 38.01; H, 4.71; N, 7.96. | |
| BA SU | 6633 | 7.81 |
| ST AU | 6538P | 15.6 |
| ST AU | SMITH | 15.6 |
| ST AU | CHP | 62.5 |
| ST AU | 53-180 | 31.3 |
| SA PA | 11737 | 250 |

What is claimed is:

1. A compound of the formula:

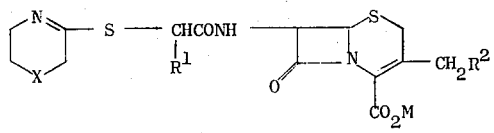

in which

R¹ is a member selected from the group consisting of —H, alkyl of 1 to 3 carbon atoms and phenyl;

R² is a member selected from the group consisting of —H and alkanoyloxy of 2 to 6 carbon atoms;

X is one of the groups —O—, —S— or —NH—;

M is a member selected from the group consisting of —H, an alkali metal cation and the ammonium ion; and the pharmaceutically acceptable acid addition salts thereof.

2. A compound of claim 1 of the formula:

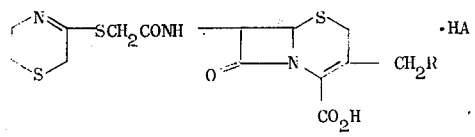

in which

R² is a member selected from the group consisting of —H and acetoxy and

A is —Cl or —Br.

3. The compound of claim 1 which is 7-[2-(5,6-dihydro-2H-1,4-thiazin-3-ylthio)acetamido] cephalosporanic acid and the hydrohalide addition salts thereof.

4. The compound of claim 1 which is 7-[2-(5,6-dihydro-2H-1,4-thiazin-3-ylthio)acetamido]-3-methyl-8-oxo-5-thia-1-azabicyclo[4.2.0]oct-2-ene-2-carboxylic acid and the hydrohalide addition salts thereof.

* * * * *